United States Patent
Lee et al.

(10) Patent No.: US 10,654,994 B1
(45) Date of Patent: May 19, 2020

(54) STYRENE-BUTADIENE RUBBER COMPOUND AND RUBBER COMPOSITION FOR TIRE BEAD FILLERS COMPRISING THE SAME

(71) Applicant: LG Chem, Ltd., Seoul (KR)

(72) Inventors: Se Eun Lee, Daejeon (KR); Byoung Yun Kim, Daejeon (KR); In Sung Jo, Daejeon (KR); Jae Min Lee, Daejeon (KR); Woo Seok Choi, Daejeon (KR)

(73) Assignee: LG Chem, Ltd. (KR)

( * ) Notice: Subject to any disclaimer, the term of this patent is extended or adjusted under 35 U.S.C. 154(b) by 284 days.

(21) Appl. No.: 15/761,329

(22) PCT Filed: Dec. 28, 2016

(86) PCT No.: PCT/KR2016/015368
§ 371 (c)(1),
(2) Date: Mar. 19, 2018

(87) PCT Pub. No.: WO2018/088628
PCT Pub. Date: May 17, 2018

(30) Foreign Application Priority Data

Nov. 10, 2016 (KR) .................. 10-2016-0149391

(51) Int. Cl.
*C08L 9/06* (2006.01)
*C08F 212/08* (2006.01)
*B60C 1/00* (2006.01)
*C08F 236/10* (2006.01)

(52) U.S. Cl.
CPC ................. *C08L 9/06* (2013.01); *B60C 1/00* (2013.01); *C08F 212/08* (2013.01); *C08F 236/10* (2013.01); *B60C 2001/0058* (2013.01); *C08L 2205/025* (2013.01)

(58) Field of Classification Search
CPC ........ C08L 9/06; C08L 2205/025; B60C 1/00; B60C 2001/0058; C08F 212/108; C08F 236/10
See application file for complete search history.

(56) References Cited

U.S. PATENT DOCUMENTS

| | | | |
|---|---|---|---|
| 3,976,721 A | 8/1976 | Satake et al. | |
| 4,239,669 A | 12/1980 | Scott et al. | |
| 4,748,168 A * | 5/1988 | Kawakami et al. | .. B60C 1/0016 524/474 |
| 4,866,131 A | 9/1989 | Fujimaki et al. | |
| 4,929,679 A | 5/1990 | Akita et al. | |
| 5,663,002 A * | 9/1997 | Schirmer | ............... B32B 27/08 428/475.8 |
| 6,127,488 A | 10/2000 | Obrecht et al. | |
| 6,265,454 B1 | 7/2001 | McNutt et al. | |
| 6,458,884 B1 | 10/2002 | Colvin et al. | |
| 2002/0124927 A1 | 9/2002 | Duddey | |
| 2011/0263750 A1 | 10/2011 | Lopitaux et al. | |
| 2012/0077902 A1 | 3/2012 | Steiner et al. | |
| 2012/0267026 A1 | 10/2012 | Miyazaki | |
| 2015/0152253 A1 | 6/2015 | Rogoza et al. | |
| 2015/0259515 A1 | 9/2015 | Takizawa et al. | |
| 2017/0369684 A1 | 12/2017 | Lee et al. | |

FOREIGN PATENT DOCUMENTS

| | | |
|---|---|---|
| CN | 102417636 A | 4/2012 |
| CN | 102432927 A | 5/2012 |
| CN | 103012882 A | 4/2013 |
| CN | 105175808 A | 12/2015 |
| CN | 105175829 A | 12/2015 |
| CN | 105175832 A | 12/2015 |
| EP | 1020492 A1 | 7/2000 |
| EP | 1645575 A1 | 4/2006 |
| EP | 2772513 A1 | 9/2014 |
| EP | 3037468 A1 | 6/2016 |
| GB | 2172002 A | 9/1986 |
| JP | S58122827 A | 7/1983 |
| JP | S63241054 A | 10/1988 |
| JP | 2594809 B2 | 3/1997 |
| JP | 2702701 B2 | 1/1998 |
| JP | 2006022243 A | 1/2006 |
| JP | 3790462 B2 | 6/2006 |
| JP | 3794810 B2 | 7/2006 |
| JP | 2011526310 A | 10/2011 |
| KR | 19950005857 A | 3/1995 |
| KR | 19980009357 A | 4/1998 |
| KR | 20110071605 A | 6/2011 |
| KR | 101187270 B1 | 10/2012 |
| KR | 20130119018 A | 10/2013 |
| KR | 101527624 B1 | 6/2015 |
| KR | 20150067744 A | 6/2015 |
| KR | 20160077895 A | 7/2016 |
| KR | 20170062734 A | 6/2017 |
| WO | 0047645 A1 | 8/2000 |
| WO | 2013132631 A1 | 9/2013 |

OTHER PUBLICATIONS

Search Report from Chinese Office Action for CN201680059355.5 dated Nov. 6, 2019.

(Continued)

*Primary Examiner* — Nathan M Nutter
(74) *Attorney, Agent, or Firm* — Lerner, David, Littenberg, Krumholz & Mentlik, LLP

(57) ABSTRACT

The present invention relates to a styrene-butadiene rubber compound and a rubber composition for tire bead fillers including the same, and more particularly, to a styrene-butadiene rubber compound capable of improving stiffness and hardness even when styrene-butadiene rubbers having different styrene contents are used instead of a combination of a conventional natural rubber and a phenol-based resin, and a rubber composition for tire bead fillers including the same.

10 Claims, No Drawings

(56) References Cited

OTHER PUBLICATIONS

Extended European Search Report including Written Opinion for Application No. EP16915409.3 dated Jan. 8, 2019.
Search report from International Application No. PCT/KR2016/015368, dated Jul. 24, 2017.

* cited by examiner

STYRENE-BUTADIENE RUBBER COMPOUND AND RUBBER COMPOSITION FOR TIRE BEAD FILLERS COMPRISING THE SAME

CROSS REFERENCE TO RELATED APPLICATIONS

The present application is a national phase entry under 35 U.S.C. § 371 of International Application No. PCT/KR2016/015368 filed Dec. 28, 2016, which claims priority from Korean Patent Application No. 10-2016-0149391, filed on Nov. 10, 2016 in the Korean Intellectual Property Office, the disclosures of which are incorporated herein by reference.

TECHNICAL FIELD

The present invention relates to a styrene-butadiene rubber compound having excellent stiffness and hardness, and a rubber composition for tire bead fillers including the same.

BACKGROUND ART

A tire bead filler rubber requires higher stiffness and hardness when compared to rubber compounds in other parts in order to support a load of a vehicle transferred to a rim when the rim is installed in a tire. Also, the high rubber stiffness is required to prevent bead unseating that may be caused during car driving.

A method of increasing a content of an inorganic substance such as clay to enhance hardness and stiffness of a rubber is used to improve stiffness of a tire bead filler rubber. However, when the content of the clay is high in this way, the hardness of the rubber is enhanced, but rolling resistance performance of tires may be deteriorated due to increase of heat generated between the clay and the rubber, rubber blending characteristics may be degraded, and a tensile strength may be lowered. Also, the clay commonly used in the art has a low reinforcing effect on a rubber composition due to a low oil adsorption quantity thereof.

As another method to improve the stiffness of the tire bead filler rubber, a method using a novolac-type phenol-based resin or a modified phenol-based resin to improve stiffness and hardness of the rubber has also been proposed. Such a method has an advantage in that the stiffness and hardness of the rubber are improved, but it has also a drawback in that stiffness of the rubber may be degraded as stiffness of the resin is degraded at a high-temperature condition, that is, a driving condition after tires are mounted.

As an alternative to such a method, Korean Unexamined Patent Publication No. 2011-0071605 discloses that two types of carbon black having different physical properties are used in a raw rubber, and Korean Unexamined Patent Publication No. 2016-0077895 discloses that a thermoplastic elastomer is used in a raw rubber to promote improvement of stiffness of the rubber. Such methods have an advantage in that the stiffness is somewhat improved, but they do not yield satisfactory results. In particular, since a natural rubber is used in the rubber composition as disclosed in the patents, it is impossible to secure sufficient hardness of a finally manufactured bead filler due to low compatibility with a synthetic rubber added together with the natural rubber.

PRIOR-ART DOCUMENTS

Patent Documents

Korean Unexamined Patent Publication No. 1998-0009357 (Apr. 30, 1998) entitled "Rubber Composition for Tire Bead Fillers"

Korean Unexamined Patent Publication No. 2011-0071605 (Jun. 29, 2011) entitled "Rubber Composition for Tire Bead Fillers and Tire Manufactured Using the Same"

Korean Unexamined Patent Publication No. 2016-0077895 (Jul. 4, 2016) entitled "Rubber Composition for Tire Bead Fillers and Tire Manufactured Using the Same"

DISCLOSURE

Technical Problem

Accordingly, the present inventors have conducted research to enhance hardness and stiffness using only a synthetic rubber to manufacture a bead filler of tires, and found that, because the hardness and stiffness are improved when a mixture of styrene-butadiene rubbers having different styrene contents is used, the styrene-butadiene rubbers may be used as alternatives to the natural rubber and the phenol-based resin. Therefore, the present invention has been completed based on the facts.

Accordingly, it is an aspect of the present invention to provide a rubber composition for tire bead fillers having high hardness and stiffness.

Technical Solution

To solve the above problems, according to an aspect of the present invention, there is provided a styrene-butadiene rubber compound which includes:

a) a first styrene-butadiene rubber having a styrene content of 60 to 95% by weight, a particle size of 100 to 200 nm, and a Mooney viscosity difference ($\Delta MV$) of 3 to 7 before/after blending; and b) a second styrene-butadiene rubber having a styrene content of 5 to 10% by weight.

According to another aspect of the present invention, there is provided a rubber composition for tire bead fillers, which includes a rubber, a reinforcing agent, and an additive, wherein the rubber includes the styrene-butadiene rubber compound as described above.

Advantageous Effects

The rubber composition provided in the present invention enables to manufacture tires using only a synthetic rubber because use of a conventional resin such as a phenol-based resin whose stiffness is problematic can be excluded thereby and a natural rubber and the phenol-based resin can be replaced therewith.

BEST MODE

The present invention provides a compound capable of improving physical properties such as strength and stiffness through the use of only a synthetic rubber without using a natural rubber and a phenol-based resin, which are used to manufacture a bead filler of tires, and a rubber composition for tire bead fillers including the same.

A styrene-butadiene rubber is composed of a repeating unit of styrene and a repeating unit of butadiene.

A typical styrene-butadiene rubber has a total styrene content of 23.5% by weight in a butadiene rubber. A butadiene rubber having a content of styrene higher than that of the styrene-butadiene rubber is referred to as a high styrene butadiene rubber, and a butadiene rubber having a content of styrene lower than that of the styrene-butadiene rubber is referred to as a low styrene butadiene rubber.

A mixture of styrene butadiene rubbers having different styrene contents, that is, a high styrene butadiene rubber (hereinafter referred to as a 'first styrene-butadiene rubber') and a low styrene butadiene rubber (hereinafter referred to as a 'second styrene-butadiene rubber') is used as the compound provided in the present invention. Generally, the styrene-butadiene rubbers having different styrene contents are not easily blended. However, in the present invention, a styrene-butadiene rubber whose particle size and Mooney viscosity are controlled is used as the first styrene-butadiene rubber having a high content of styrene, and a styrene-butadiene rubber in which a polymerization process is regulated is used as the second styrene-butadiene rubber having a low content of styrene. In this case, excellent thermal stability after blending may be exhibited, and processability and adhesivity may be improved during processing, which makes it possible to manufacture a molded product having improved physical properties, particularly stiffness (i.e., tensile strength) and hardness.

Hereinafter, each of the styrene-butadiene rubbers will be described in detail.

First Styrene-Butadiene Rubber

As a first component of the rubber composition provided in the present invention, a first styrene-butadiene rubber has a styrene content of 60 to 95% by weight, preferably a styrene content of 80 to 90% by weight as described above, and has a cross-linked structure.

In theory, the use of the styrene-butadiene rubbers having different styrene contents has an advantage in that an effect of compensating the physical properties with each other may be secured, but has various problems when the styrene-butadiene rubbers are actually applied to processes due to low miscibility. However, when a styrene-butadiene rubber having a particle size of 100 to 200 nm and a Mooney viscosity ($ML_{(1+4)}$ at 100° C.) difference ($\Delta MV$) of 3 to 7 before/after blending is used as the first styrene-butadiene rubber of the present invention, miscibility between the first and second styrene-butadiene rubbers may be enhanced.

The particle size of the first styrene-butadiene rubber may be measured using a conventional device used to measure a particle size of latex. In this case, the average particle diameter of the first styrene-butadiene rubber satisfies this range, that is, a range of 100 to 200 nm, preferably a range of 120 to 180 nm. When the average particle diameter falls within this particle size range, miscibility of the first styrene-butadiene rubber with the second styrene-butadiene rubber may be enhanced, an effect of improving stiffness and hardness obtained through the use of the mixture of the first and second styrene-butadiene rubbers may be expected. When the particle size is too small, aggregation between particles may occur, which makes it impossible to uniformly blend the first styrene-butadiene rubber with the second styrene-butadiene rubber. On the other hand, when the particle size is too large, desired stiffness and hardness specifications may not be achieved.

Also, a styrene-butadiene rubber in which a difference between Mooney viscosities before and after blending falls within a predetermined viscosity range is used as the first styrene-butadiene rubber of the present invention.

The term "Mooney viscosity" refers to a value converted from a viscosity behavior of a rubber or a rubber compound (or a compound) measured according to a temperature. In this case, a criterion of measurement is expressed by $ML_{1+4}$ (at 100° C.). Here, ML means that the size of a rotor is 'LARGE,' the numerals 1 and 4 in '1+4' represent a time of 1 minute used to warm up a specimen at a specified temperature and a measurement time of 4 minutes, respectively, and 100° C. represents a measurement temperature. That is, the Mooney viscosity is expressed by a numerical value indicating level of force applied at what temperature for what time. In this case, the Mooney viscosity of 3 means that a viscosity value measured after a large disc is preheated at a temperature of 100° C. for one minute and kept for 4 minutes is 3.

The first styrene-butadiene rubber is in a cross-linked shape. Therefore, unlike the second styrene-butadiene rubber having a linear structure, it is difficult to measure a gel content of the first styrene-butadiene rubber. Such a gel content may be predicted through a change in Mooney viscosity before/after blending. Preferably, a styrene-butadiene rubber having a Mooney viscosity difference ($\Delta MV$) of 3 to 7, preferably 3 to 6.7 before/after blending as measured by a standard ASTM blending method is used.

As disclosed above, a styrene-butadiene rubber whose average particle diameter and Mooney viscosity are defined at the same time is used as the first styrene-butadiene rubber according to the present invention. When the average particle diameter of the first styrene-butadiene rubber satisfies this particle size range but the Mooney viscosity difference is greater than this viscosity range, stiffness and hardness may be degraded. On the other hand, when the Mooney viscosity difference satisfies this viscosity range but the average particle diameter is outside this particle size range, the stiffness and hardness may also be degraded.

Also, a styrene-butadiene rubber having a weight average molecular weight of 100,000 g/mol to 2,000,000 g/mol, particularly 300,000 g/mol to 2,000,000 g/mol, and more particularly 500,000 g/mol to 2,000,000 g/mol is used as the first styrene-butadiene rubber of the present invention.

Meanwhile, the first styrene-butadiene rubber provided in the present invention has a structure in which styrene and butadiene are cross-linked, and is prepared through emulsion polymerization.

Typically, the first styrene-butadiene rubber has a structure in which styrene and butadiene are cross-linked by a cross-linking agent, and has a high level of gel content. However, in the first styrene-butadiene rubber of the present invention, cross-linking is performed using only monomers, that is, styrene and butadiene without using a cross-linking agent. In this case, the cross-linking is performed by adjusting a polymerization temperature and a polymerization conversion rate. In this way, when the cross-linking is performed without using a cross-linking agent, a content of styrene may be further increased, and a cross-linking content and density may be easily adjusted through the use of a molecular weight modifier.

Specifically, the first styrene-butadiene rubber may be prepared through emulsion polymerization after an emulsifying agent, an initiator, and a molecular weight modifier are added to styrene and butadiene monomers. Then, the first styrene-butadiene rubber may be prepared in a latex shape, collected in a powdery shape by aggregation, and then blended.

The styrene and butadiene monomers are used at contents of 80 to 95% by weight and 5 to 20% by weight, respectively, based on a total of 100% by weight of the sum of the monomers. Within this content range, a rubber having a high content of styrene may be prepared.

The styrene monomer may include one or more selected from the group consisting of styrene; α-methyl styrene, o-methyl styrene, p-methyl styrene, m-methyl styrene, ethyl styrene, i-butyl styrene, t-butyl styrene, or an alkyl styrene having properties equivalent thereto; and o-bromostyrene, p-bromostyrene, m-bromostyrene, o-chlorostyrene, p-chlorostyrene, m-chlorostyrene, or a halogenated styrene styrene having properties equivalent thereto.

Also, the butadiene monomer may impart flexibility to styrene-butadiene-based latex, and may play a role of cross-linking. For example, the butadiene monomer may include butadiene such as 1,3-butadiene, 1,4-butadiene, 2,3-dimethyl-1,3-butadiene, or 2-ethyl-1,3-butadiene, or a derivative thereof. In addition to these compounds, the butadiene monomer may further include conjugated diene-based monomer such as 2-methyl-1,3-pentadiene, 1,3-pentadiene, 3-methyl-1,3-pentadiene, 4-methyl-1,3-pentadiene, 1,3-hexadiene, or 2,4-hexadiene.

In this case, one method selected from a method of adding a monomer mixture to a polymerization reactor all at once, a method of continuously adding a monomer mixture to a polymerization reactor, and a method of adding some of a monomer mixture to a polymerization reactor and continuously adding the other monomer mixture to the polymerization reactor may be used as a method of adding the styrene and butadiene monomers.

In the present invention, the emulsifying agent is not particularly limited, and may include emulsifying agents generally used in the related art. For example, the emulsifying agent may include known emulsifying agents such as phosphate-based, carboxylate-based, sulfate-based, succinate-based, sulfosuccinate-based, sulfonate-based, disulfonate-based emulsifying agents, and the like, but the present invention is particularly limited thereto. For example, one or a combination of two or more selected from the group consisting of an alkyl aryl sulfonate, an alkali methyl alkyl sulfate, a sulfonated alkylester, soap of fatty acid, and an alkali salt of rosinate may be used.

Such an emulsifying agent is used at a content of 0.1 to 5 parts by weight, preferably 0.5 to 3 parts by weight, based on a total of 100 parts by weight of the sum of the monomers. When the content of the emulsifying agent is less than this content range, polymerization stability may be degraded. On the other hand, when the content of the emulsifying agent is greater than this content range, bubbles may be increasingly formed.

The molecular weight modifier is not particularly limited, and may, for example include an α-methylstyrene dimer, mercaptans such as t-dodecyl mercaptan, n-dodecyl mercaptan, octyl mercaptan, and the like, halogenated hydrocarbons such as carbon tetrachloride, methylene chloride, methylene bromide, and the like, sulfur-containing compounds such as tetraethyl thiuram disulfide, dipentamethylene thiuram disulfide, diisopropyl xanthogen disulfide, and the like. Preferably, the molecular weight modifier may be t-dodecyl mercaptan.

Also, the molecular weight modifier may be added at a content of 0.2 to 0.6 parts by weight, based on a total of 100 parts by weight of the sum of the monomers, but the present invention is not limited thereto.

A polymerization initiator may serve to regulate a molecular weight, a gel content, and a gel structure of the first styrene-butadiene rubber. For example, a radical initiator may be used as the polymerization initiator, but the present invention is not limited thereto. The radical initiator may include one or more selected from the group consisting of inorganic peroxides such as sodium persulfate, potassium persulfate, ammonium persulfate, potassium superphosphate, hydrogen peroxide, and the like; organic peroxides such as t-butyl peroxide, cumene hydroperoxide, p-mentane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, t-butyl peroxy isobutyrate, and the like; azobis isobutyronitrile, azobis-2,4-dimethylvaleronitrile, azobis cyclohexane carbonitrile, and azobis isobutyric acid (butylic acid) methyl. Among such radical initiators, the inorganic peroxides are more preferred. Among these, a persulfate may be preferably used.

The polymerization initiator used is included at a content of 0.01 to 2 parts by weight, preferably 0.02 to 1.5 parts by weight, based on a total of 100 parts by weight of the sum of the monomers. When the content of the polymerization initiator is less than this content range, a polymerization rate may be reduced, which makes it difficult to prepare a final product. When the polymerization initiator is greater than this content range, polymerization control is impossible due to a very fast polymerization rate.

In this case, minor components such as a molecular weight modifier, an activating agent, a chelating agent, a dispersing agent, a pH regulator, a deoxidizing agent, a particle size modifier, an antioxidant, an oxygen scavenger, and the like may be optionally added in addition to the aforementioned compositions.

As described above, the first styrene-butadiene rubber provided in the present invention may be cross-linked without a cross-linking agent by regulating a polymerization temperature and a polymerization conversion rate.

A high-temperature rubber (or a hot polymer) whose polymerization is performed at a polymerization temperature of 40° C. or higher has a high gel content and excellent processability, and a low-temperature rubber (or a cold polymer) whose polymerization is performed at a polymerization temperature of 10° C. or less has a low gel content.

In the present invention, the polymerization is performed at a high temperature, preferably performed at a high temperature of 40 to 80° C., preferably 45 to 75° C. After a polymerization conversion rate reaches 90% or more, the polymerization is terminated.

After the polymerization is terminated, the first styrene-butadiene rubber manufactured in a latex shape is subjected to conventional subsequent processes such as coagulation and washing so that the first styrene-butadiene rubber is obtained in a powdery shape.

The coagulation is performed by adding a coagulant. In this case, the coagulant includes metal chlorides (halides) such as barium chloride, calcium chloride, magnesium chloride, zinc chloride, and aluminum chloride; nitrates such as barium nitrate, calcium nitrate, and zinc nitrate; acetates such as barium acetate, calcium acetate, and zinc acetate; sulfates such as calcium sulfate, magnesium sulfate, and aluminum sulfate; and the like. Among these, calcium chloride and magnesium sulfate are preferred. The coagulation may be performed at 50 to 100° C., and the coagulant may be kept at a content of 5% by weight or less during coagulation, based on the total amount of the sum of the salts used for the coagulation.

The washing may be performed at 50 to 90° C. using distilled water, and the like.

Second Styrene-Butadiene Rubber

Also, as a second component of the rubber composition provided in the present invention, a second styrene-butadiene rubber is a rubber having a linear structure and having a styrene content of 1 to 15% by weight, preferably 5 to 10% by weight.

The second styrene-butadiene rubber is manufactured through emulsion polymerization. In this case, a styrene-butadiene rubber manufactured through the emulsion polymerization at a low temperature using a mixture of an aliphatic organic acid and a sulfonate-based compound is used as the second styrene-butadiene rubber.

First, monomers, an emulsifying agent, a polymerization initiator, a molecular weight modifier, and deionized water are added to a polymerization reactor.

Styrene and butadiene are used as the monomers. In this case, the styrene is used at a content of 1 to 15% by weight, preferably 5 to 10% by weight, based on a total of 100% by weight of the sum of the monomers, and the butadiene is used at a content of 85 to 99% by weight, preferably 90 to 95% by weight. When the contents of the monomers are outside these content ranges, it is difficult to manufacture a low styrene-butadiene rubber having desired physical properties.

In particular, the second styrene-butadiene rubber of the present invention is manufactured using a certain emulsifying agent used during emulsion polymerization. In this case, the second styrene-butadiene rubber of the present invention is manufactured through polymerization at a low temperature.

An aliphatic organic acid and a sulfonate-based compound are used together as the emulsifying agent.

The aliphatic organic acid may, for example, be an aliphatic organic acid having 12 to 18 carbon atoms, or an aliphatic organic acid having 14 to 18 carbon atoms or 16 to 18 carbon atoms. As a specific example, one or more selected from oleic acid, lauric acid, myristic acid, palmitic acid, stearic acid, naphthalene sulfonic acid, and eicosanoic acid may be used as the aliphatic organic acid.

The sulfonate-based compound includes one selected from the group consisting of an alkyl aryl sulfonate, an alkali methyl alkyl sulfate, a sulfonated alkylester, an alkali salt of rosinate, a naphthalene sulfonic acid, and a combination thereof. Preferably, sodium 1-(n-alkyl-naphthalene-4-sulfonate) (SANS), and sodium dodecyl benzene sulfonate (SDBS) are used, but the present invention is not limited thereto.

Such a sulfonate-based compound is used at a content of 0.1 to 5 parts by weight, preferably 0.5 to 3 parts by weight, based on a total of 100 parts by weight of the sum of the monomers. When the content of the sulfonate-based compound is less than this content range, polymerization stability may be degraded. On the other hand, when the content of the sulfonate-based compound is greater than this content range, bubbles may be increasingly formed.

Also, the aliphatic organic acid and the sulfonate-based compound are used at a weight ratio of 1:1 to 10:1. When the aliphatic organic acid is used at an excessive amount, a coagulum in the resulting second styrene-butadiene rubber latex may increase. On the other hand, when the sulfonate-based compound is used at an excessive amount, a polymerization time may be lengthened. Therefore, the aliphatic organic acid and the sulfonate-based compound are properly used within these content ranges.

In this case, a polymerization initiator, a reaction terminator, and the like used together are as described above for the first styrene-butadiene rubber.

In case of the polymerization temperature, however, emulsion polymerization may be performed at a polymerization temperature of 5 to 20° C., preferably a low temperature of 5 to 15° C., and performed for a time that a polymerization conversion rate is reached 80% to be 7 to 8 hours. Such a polymerization time may be shortened by 1 to 2 hours when compared to the typical time required, resulting in reduced process time for the whole reaction.

For polymerization completion, the polymerization is conventionally terminated when a polymerization conversion rate reaches 80%. In this case, a second styrene-butadiene rubber in a latex shape is obtained.

A styrene-butadiene rubber having a weight average molecular weight of 10,000 g/mol to 2,000,000 g/mol, particularly 100,000 g/mol to 1,000,000 g/mol, and more particularly 150,000 g/mol to 800,000 g/mol is used as the second styrene-butadiene rubber thus manufactured.

The aforementioned first and second styrene-butadiene rubbers are blended with each other to prepare a compound.

In this case, when the compound includes the first styrene-butadiene rubber at 75 to 99.5% by weight, preferably 80 to 95% by weight, and the second styrene-butadiene rubber at 0.5 to 25% by weight, preferably 5 to 20% by weight, based on the total of 100% by weight of the compound, high stiffness and hardness may be secured.

When the content of the first styrene-butadiene rubber is less than this content range, or the content of the second styrene-butadiene rubber is greater than this content range, it is impossible to secure sufficient stiffness and hardness. On the other hand, when the content of the first styrene-butadiene rubber is greater than this content range, or the content of the second styrene-butadiene rubber is less than this content range, modulus and elastic properties may be deteriorated. Therefore, the first and second styrene-butadiene rubbers are properly used within these content ranges.

As described above, the styrene-butadiene rubber compound according to the present invention has a total styrene content of 23±2% by weight and a Mooney viscosity $(ML_{(1+4)}/100°$ C.) of 46±3. Such a compound may be applied to various technical fields, particularly preferably applied to manufacturing of a bead filler of tires.

The tire bead filler is needed to support a load of a vehicle transferred to a tire rim, and thus requires high stiffness and hardness. Conventional tire bead fillers include a natural rubber, a phenol resin, carbon black, and an additive as basic ingredients, and the styrene-butadiene compound provided in the present invention may be used instead of the natural rubber and the phenol resin.

Technology in which a styrene-butadiene rubber as an additional rubber component as well as a natural rubber is used has been known in the art. However, in the present invention, it is possible to manufacture a bead filler of tires using only a synthetic rubber by basically excluding the natural rubber.

Performance of the bead filler is highly affected by a macrostructure (a molecular weight, a molecular weight distribution, a polymer side chain, a degree of crystallinity, and the like), a microstructure (arrangement of monomers, a content of polystyrene, a vinyl content of polydiene, and the like) and chemical functionalization of the styrene-butadiene rubber, and the like. That is, tendencies of an increase of glass transition temperature (Tg), a decrease of tensile strength, a relative decrease of wear resistance, and an increase of wet grip stem from the styrene content.

Accordingly, when a compound in which the rubbers having different styrene contents provided in the present invention are blended at a predetermined ratio is used, sufficient stiffness and hardness required for the bead filler are secured.

The rubber composition constituting the tire bead filler may include various additives such as a reinforcing agent such as carbon black, silica, or the like, a vulcanizing agent, a vulcanization accelerator, a processing oil, a filler, a coupling agent, an antioxidant, a softening agent, or an adhesive as other components.

Sulfur is used as the vulcanizing agent. In addition, a peroxide-based compound may be used, but a sulfur cross-linking system is generally widely used.

The vulcanization accelerator serves to promote a uniform vulcanization reaction at a rubber reaction site to improve vulcanization efficiency and increase a reaction velocity. The vulcanization accelerator may include one or more selected from the group consisting of thiazole-based, thiuram-based, thiourea-based, guanine-based, and thiocarbamate-based activators. Specific examples of the thiazole-based activator include N-t-butyl-2-benzothiazole sulfonamide (TBBS).

In the rubber composition, the processing oil acts as a softening agent, and specific examples of the processing oil may include paraffin-based, naphthene-based, or aromatic compound. More specifically, an aromatic process oil may be used in consideration of tensile strength and wear resistance, and a naphthene-based or paraffin-based process oil may be used in consideration of hysteretic loss and low-temperature characteristics. The processing oil may be included at a content of 100 parts by weight or less, based on 100 parts by weight of the compound. When the processing oil is included within this content range, degradation of tensile strength and low pyrogenicity (low fuel efficiency) of a vulcanized rubber may be prevented.

Specifically, the antioxidant may include N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a high-temperature condensation product of diphenylamine and acetone. The antioxidant may be used at a content of 0.1 parts by weight to 6 parts by weight, based on 100 parts by weight of the compound.

The rubber composition according to one exemplary embodiment of the present invention may be obtained by mixing the said ingredients using a mixer such as a Bunbury mixer, a roll mixer, an internal mixer, or the like. Also, a rubber composition having low pyrogenicity and excellent wear resistance may be obtained through a vulcanization process after mold processing.

A molded product of the rubber manufactured using such a composition and method may be applied to tires, particularly a bead filler of the tires. As such, the tires may include a tire for automobiles, a tire for buses, a tire for trucks, a tire for aircrafts, a tire for motorcycles, and the like.

MODE FOR INVENTION

Hereinafter, preferred exemplary embodiments of the present invention will be described in order to aid in understanding the present invention. However, it will be apparent to those skilled in the art that the following examples are given herein for the purpose of illustrations only, and various changes and modifications can be made to the embodiments of the present invention without departing from the scope of the present invention, so it should be understood that the present invention covers all such changes and modifications provided they are within the scope of the appended claims and their equivalents.

EXAMPLES

Example 1

(1) Manufacture of First Styrene-Butadiene-Based Rubber 1.2 parts by weight of potassium rosinate and 1.5 parts by weight of potassium oleate, both of which served as the emulsifying agents, 0.05 parts by weight of dodecyl mercaptan, 0.5 parts by weight of cumene hydroperoxide, and 200 parts by weight of water were added to a reaction container, based on 100 parts by weight of the monomer including 12 parts by weight of 1,4-butadiene and 88 parts by weight of styrene, and the resulting mixture was subjected to emulsion polymerization at 10° C. to prepare first styrene-butadiene rubber latex. The reaction was terminated at a point of time when a conventional polymerization conversion rate reached 90%.

2 parts by weight of calcium chloride was added to 100 parts by weight (solid content) of the prepared first styrene-butadiene rubber latex, and the resulting mixture was warmed to 70° C., aged for 20 minutes, and then cooled to obtain a coagulum. Then, the coagulum was washed 2 to 3 times with ion-exchanged water to remove residual monomers, and then dehydrated through a filter. Subsequently, the filtrate was dried using a roll dryer to manufacture a high styrene-butadiene rubber.

The particle size of the manufactured first styrene-butadiene rubber was measured using a particle size analyzer. As a result, the first styrene-butadiene rubber was measured to have an average particle diameter of 120 nm.

(2) Manufacture of Second Styrene-Butadiene-Based Rubber 3.5 parts by weight of an aliphatic organic acid (fatty acid; Name of Company: LG Household & Health Care Ltd., and Product Name: ELOFAD TP 200), 0.5 parts by weight of sodium 1-(n-alkyl-naphthalene-4-sulfonate (SANS), 0.05 parts by weight of dodecyl mercaptan, 0.5 parts by weight of cumene hydroperoxide, and 200 parts by weight of water were added to a reaction container, based on 100 parts by weight of the monomer including 94 parts by weight of 1,4-butadiene and 6 parts by weight of styrene, and the resulting mixture was subjected to emulsion polymerization at 10° C. to manufacture a second styrene-butadiene rubber. The reaction was terminated at a point of time when a conventional polymerization conversion rate reached 80%.

The particle size of the manufactured second styrene-butadiene rubber was measured using a particle size analyzer. As a result, the second styrene-butadiene rubber was measured to have an average particle diameter of 250 nm.

(3) Manufacture of Compound

The first and second styrene-butadiene rubbers manufactured in Steps (1) and (2) were latex-blended at a weight ratio of 8:2. Thereafter, 2 parts by weight of calcium chloride was added to 100 parts by weight (solid content) of the blending latex, and the resulting mixture was warmed to 70° C., aged for 20 minutes, and then cooled to obtain a coagulum. Then, the coagulum was washed 2 to 3 times with ion-exchanged water to remove residual monomers, and then dehydrated through a filter. Subsequently, the filtrate was dried using a roll dryer to manufacture a compound in the form of a coagulum.

The coagulum of the styrene-butadiene rubber thus manufactured was blended according to ASTM D3187 using a Bunbury mixer to manufacture a specimen.

Example 2

A rubber compound specimen was manufactured in the same manner as in Example 1, except that a first styrene-butadiene rubber having an average particle diameter of 140 nm was manufactured and used.

Example 3

A rubber compound specimen was manufactured in the same manner as in Example 1, except that a first styrene-butadiene rubber having an average particle diameter of 180 nm was manufactured and used.

Comparative Example 1

A rubber compound specimen was manufactured in the same manner as in Example 1, except that a first styrene-butadiene rubber having an average particle diameter of 80 nm was manufactured and used.

Comparative Example 2

A rubber compound specimen was manufactured in the same manner as in Example 1, except that a first styrene-butadiene rubber having an average particle diameter of 90 nm was manufactured and used.

Comparative Example 3

A rubber compound specimen was manufactured in the same manner as in Example 1, except that a first styrene-butadiene rubber having an average particle diameter of 100 nm was manufactured and used.

Comparative Example 4

A rubber compound specimen was manufactured in the same manner as in Example 1, except that a first styrene-butadiene rubber having an average particle diameter of 130 nm was manufactured and used.

Comparative Example 5

A rubber compound specimen was manufactured in the same manner as in Example 1, except that a first styrene-butadiene rubber having an average particle diameter of 210 nm was manufactured and used.

TABLE 1

|  | First styrene-butadiene rubber | | |
|---|---|---|---|
|  | Content ratio (weight) First/second styrene-butadiene rubbers | Particle size (nm) | Mooney viscosity difference (ΔMV) after compounding |
| Example 1 | 8:2 | 120 | 6.7 |
| Example 2 | 8:2 | 140 | 5.0 |
| Example 3 | 8:2 | 180 | 3.0 |
| Comparative Example 1 | 8:2 | 80 | 5.0 |
| Comparative Example 2 | 8:2 | 90 | 6.0 |
| Comparative Example 3 | 8:2 | 100 | 8.0 |
| Comparative Example 4 | 8:2 | 130 | 2.5 |
| Comparative Example 5 | 8:2 | 210 | 5.0 |

Experimental Example 1

Physical properties of the rubber specimens manufactured in Examples and Comparative Examples were measured, as follows. The results are listed in the following Table 2.

(1) Compound Characteristics

Mooney viscosity (MV): Measured according to DIN 53523/3.

Conditions for evaluation of thermal stability upon blending

A milling operation (Sample amount: 200 g) was performed on specimens having a thickness of 0.2 mm using a 160° C. roller, and the aged specimens were collected at intervals of 1.5, 5, 10, 15, 20, 25, 30, 40, 50, and 60 minutes. Thereafter, the color stability upon blending was evaluated. The evaluation was performed using a 5-point method. On the scale ranging from 0 to 5 points, the lower point means that the thermal stability upon blending is more degraded.

(2) Vulcanization Characteristics (Moving Die Rheometer (MDR))

A vulcanization profile and analysis data associated with the vulcanization profile were determined according to ASTM D5289-95 using a Monsanto MDR2000 rheometer.

T5: A time required until 5% of a specimen is vulcanized was measured (at 160° C. for 3 minutes).

Vmax (vulcanization rate): Vmax refers to a peak torque required for 100% vulcanization.

(3) Mechanical Properties

Tensile strength (TS, $kgf/cm^2$): The compound was vulcanized at 145° C. for 45 minutes, and the tensile strength of a 300% vulcanized product was then measured.

Elongation (%): The compound was vulcanized at 145° C. for 45 minutes, and the elongation of a vulcanized product was then measured.

100% Modulus ($kgf/cm^2$): The compound was vulcanized at 145° C. for 45 minutes, and the modulus upon 100% elongation was then measured.

Hardness: Durometer hardness (JIS A, Shore type) was used according to ASTM D2240 to measure hardness of the manufactured vulcanized product. The vulcanized specimen was manufactured to have a minimum thickness of 6 mm, and a needle was placed perpendicularly to a surface of the specimen to be measured. The hardness at the center of the specimen was measured at a load of approximately 2 kg (19.6 N) in triplicate, and an average value was then calculated.

TABLE 2

| | | Examples | | | Comparative Examples | | | | |
|---|---|---|---|---|---|---|---|---|---|
| | | 1 | 2 | 3 | 1 | 2 | 3 | 4 | 5 |
| Physical properties of rubber compound | MV | 47 | 46 | 45 | 47 | 45 | 43 | 46 | 41 |
| | Thermal stability upon blending (5-point method) | 39.1 | 38.2 | 39.2 | 41.2 | 42.0 | 43.2 | 40.0 | 39.9 |
| MDR (at 160° C. for 30 min) | T5 (min) | 1.31 | 1.34 | 1.39 | 1.08 | 1.13 | 1.2 | 1.32 | 1.4 |
| | Vmax (N.M) | 24.7 | 25.1 | 25.9 | 21.2 | 22.1 | 26.2 | 21.8 | 24.1 |

TABLE 2-continued

|  |  | Examples | | | Comparative Examples | | | | |
| --- | --- | --- | --- | --- | --- | --- | --- | --- | --- |
|  |  | 1 | 2 | 3 | 1 | 2 | 3 | 4 | 5 |
| Mechanical properties | Tensile strength (kgf/cm$^2$) | 187 | 185 | 193 | 171 | 156 | 167 | 156 | 178 |
|  | Elongation (%) | 332 | 374 | 347 | 298 | 275 | 277 | 374 | 362 |
|  | 100% modulus (kgf/cm$^2$) | 59 | 51 | 56 | 48 | 52 | 55 | 45 | 45 |
|  | Hardness | 80 | 79 | 78 | 78 | 77 | 77 | 76 | 75 |

Referring to Table 2, it was revealed that the rubber compounds, in which the first styrene-butadiene rubbers of Examples whose particle sizes and Mooney viscosities were defined according to the present invention were used, exhibited equivalent or superior results for all the physical properties compared to the compounds of Comparative Examples. The rubber compounds, particularly, exhibited highly improved stiffness and hardness.

Specifically, it was revealed that the rubber compounds generally had low physical properties when the particles of the first styrene-butadiene rubber were very small as in Comparative Examples 1 and 2. Also, it was revealed that the rubber compound had high elongation characteristics, but the stiffness and hardness were degraded accordingly when the first styrene-butadiene rubber had a high average particle diameter as in Comparative Example 5. Further, it was revealed that, when the average particle diameters of the rubber compounds fell within the range of the present invention but the Mooney viscosity was higher or lower than the range of the present invention as in Comparative Examples 3 and 4, all the physical properties such as stiffness, elongation, modulus, and hardness were inferior to that of the compounds of Examples 1 to 3.

INDUSTRIAL APPLICABILITY

The rubber compound provided in the present invention and the bead filler manufactured using the same may be applied to various tires such as a tire for automobiles, a tire for buses, a tire for trucks, a tire for aircrafts, a tire for motorcycles, and the like.

The invention claimed is:

1. A styrene-butadiene rubber compound comprising:
a) a first styrene-butadiene rubber having a styrene content of 60 to 95% by weight, a particle size of 100 to 200 nm, and a Mooney viscosity difference (ΔMV) of 3 to 7 before/after blending; and
b) a second styrene-butadiene rubber having a styrene content of 5 to 10% by weight.

2. The styrene-butadiene rubber compound of claim 1, wherein the rubber compound comprises 75 to 99.5% by weight of the first styrene-butadiene rubber and 0.5 to 25% by weight of the second styrene-butadiene rubber.

3. The styrene-butadiene rubber compound of claim 1, wherein the styrene-butadiene rubber compound has a total styrene content of 23±2% by weight and a Mooney viscosity (ML$_{(1+4)}$/100° C.) of 46±3.

4. The styrene-butadiene rubber compound of claim 1, wherein the first styrene-butadiene rubber has a weight average molecular weight of 1,000 g/mol to 2,000,000 g/mol.

5. The styrene-butadiene rubber compound of claim 1, wherein the second styrene-butadiene rubber has a weight average molecular weight of 1,000 g/mol to 2,000,000 g/mol.

6. The styrene-butadiene rubber compound of claim 1, wherein the first styrene-butadiene rubber and the second styrene-butadiene rubber are manufactured by emulsion polymerization.

7. The styrene-butadiene rubber compound of claim 1, wherein the second styrene-butadiene rubber is manufactured using an aliphatic organic acid and a sulfonate-based compound as emulsifying agents.

8. A rubber composition for tire bead fillers comprising a rubber, a reinforcing agent, and an additive,
wherein the rubber comprises the styrene-butadiene rubber compound defined claim 1.

9. The rubber composition of claim 8, wherein the reinforcing agent comprises carbon black and silica.

10. The rubber composition of claim 8, wherein the additive comprises one or more selected from the group consisting of a vulcanizing agent, a vulcanization accelerator, a processing oil, a filler, a coupling agent, an antioxidant, softening agent, and an adhesive.

* * * * *